Oct. 31, 1950     R. E. IMHOFF ET AL     2,527,733
VALVE
Filed July 12, 1946
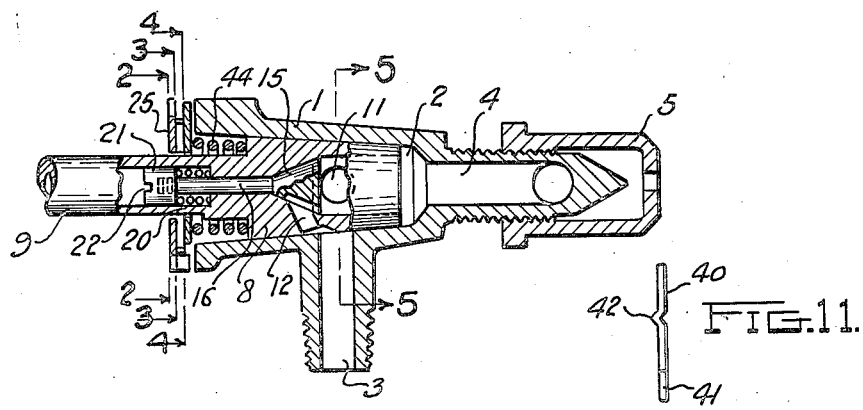
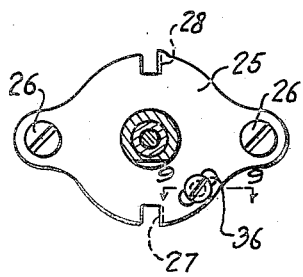 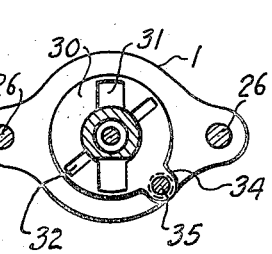 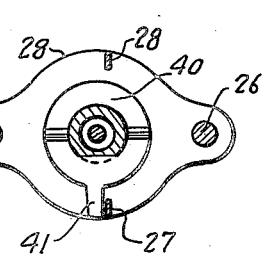
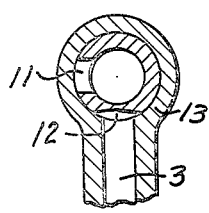 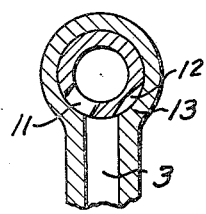 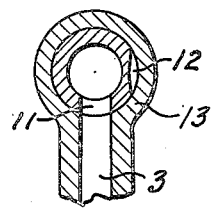 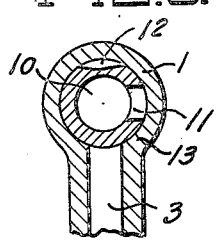
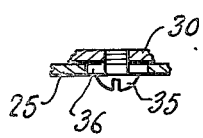 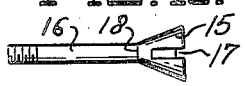
INVENTOR.
Robert E. Imhoff
William J. Wildern
BY
Barnes, Kisselle, Laughlin & Raisch
ATTORNEYS Patented Oct. 31, 1950

2,527,733

UNITED STATES PATENT OFFICE 2,527,733

VALVE

Robert E. Imhoff and William J. Wildern, Detroit, Mich., assignors to Detroit Brass & Malleable Works, Detroit, Mich., a corporation of Michigan Application July 12, 1946, Serial No. 683,172

2 Claims. (Cl. 277—59)

This invention relates to a valve and has to do particularly with a valve for controlling the flow of fluid fuel to a burner.

The valve of the present invention is intended primarily for use with gas burners. The particular object of the invention is to provide a valve so constructed and arranged that a plurality of valve positions provide for as many different rates of flow of gas through the valve for supporting flames of varying intensity. The valve shown herein for carrying out the invention has essentially four positions of adjustment, one of which is the off position, one of which is the full-on position for providing gas for a full or high flame, another position of which is medium for providing gas for a medium flame, and the fourth is a simmer position for providing a low or simmering flame. One of the particular objects of the invention is to provide a novel valve structure wherein the position of medium and simmer are independently adjustable. That is to say, an adjustment may be made for adjusting the simmer position and, therefore, the intensity of the simmer flame without affecting the adjustment of the medium position or the full-on position; also the medium position may be adjusted without affecting the simmer position or the full-on position.

Fig. 1 is a cross sectional view of a valve constructed in accordance with the invention and illustrating the same adjusted to the simmer position.

Fig. 2 is a sectional view taken substantially on line 2—2 of Fig. 1 showing the cap for the valve body.

Fig. 3 is a sectional view taken substantially on line 3—3 of Fig. 1 showing an adjustable washer element.

Fig. 4 is a sectional view taken substantially on line 4—4 of Fig. 1 illustrating a cooperating washer element.

Fig. 5 is a sectional view taken substantially on line 5—5 of Fig. 1 showing the valve adjusted to simmer position.

Fig. 6 is a view similar to Fig. 5 showing the medium position.

Fig. 7 is a view similar to Figs. 5 and 6 showing the full-on position.

Fig. 8 is a view similar to Figs. 5, 6 and 7 showing the off position.

Fig. 9 is an enlarged section taken substantially on line 9—9 of Fig. 2 showing means for providing an adjustment.

Fig. 10 is a side elevational view of one of the adjustable elements.

Fig. 11 is a side elevational view of the stop washer shown in Fig. 4.

The valve body is illustrated at 1 and it has a tapered chamber 2 for the valve member. Leading into the chamber is an inlet 3 and extending from the end of the chamber is an outlet 4 designed to receive the usual hood 5 for the discharge of gas into the mixer tube of a burner. The valve member 8 is in the form of a tapered plug provided with a stem 9 for receiving an operating handle (not shown). This valve member has a central passage or bore 10 with a side port 11 leading into the same. It also has a port 12 angularly disposed as shown in Fig. 1 which opens into the surface of the member preferably through the means of an enlarged recess 13. The bottom portion of the bore 10 is of tapered formation and leading from the small end of this tapered formation is an opening or hole as indicated in Fig. 1. A throttling member as indicated in Fig. 1 is assembled in the valve member, this element having a tapered head 15 with a stem 16. The tapered head is provided with a slot 17 which opens through the large end of the tapered head but which terminates short of the intersection 18 between the tapered head and the stem.

The operating stem 9 is hollow and the stem portion 16 projects into the same, as shown in Fig. 1. Positioned around the stem 16 is a coil spring 20 while a nut 21 is fastened to the end thereof by means of screw threads for taking the action of the spring. The spring seats against the body of the valve member around the stem 16 and the action seats the tapered head 15 on its tapered seat. The tapered seat and the tapered head 15 are accurately formed as by means of ground surfaces or the surfaces may be lapped in, to thereby provide an effective seal against escape of gas around the stem 16 and into the hollow stem 9. The nut 21 is attached tightly to the stem 16 and it is slotted or otherwise formed as at 22 for receiving a turning tool. The turning of the throttling member varies the position of the slot 17 relative to the passage 12 to throttle the same and thereby regulate the flow of gas therethrough.

The valve body is provided with a cap 25, (Fig. 2), which may be attached to the body by screws 26. This cap is provided with stops 27 and 28 and it is apertured for the passage of the stem 9 therethrough. Positioned under the cap is a washer 30. This washer is cut out to provide a relatively wide opening 31 and a relatively narrow opening 32. The washer has a projection 34 threaded to receive a screw 35. The cap 25 has a slot 36 for the passage of the screw. It will be observed that by loosening the screw that the washer 30 may be rotatably adjusted and it may be set in adjusted position by tightening the head of the screw against the cap 25.

Underlying the washer 30 is a stop washer 40 which is keyed to the stem 9 to rotate therewith. For this purpose the stem 9 may be provided with a D-shape in cross section, as shown, and the opening in the washer 40 fits the D to thus effect a driving connection. The washer 40 has a projection 41 for operating between the stops 27 and 28 on the cap. This washer 40 has lugs or projections 42 thereon which may be formed in the metal of the washer itself, as shown in Fig. 11. Positioned between the tapered body of the valve member and the washer 40 is a coil spring 44. This coil spring seats the valve member in its chamber and compacts the washers together against the underside of the cap.

In considering the operation of the valve, reference may be made to Fig. 4 which is off position of the washer 40 and the valve member is positioned as shown in Fig. 8. By turning the valve about 90° clockwise, as Figs. 4 and 8 are viewed, the projections 42 snap into the relatively wide opening 31. This indicates the full-on position as shown in Fig. 7. The projections 42 do not fit snugly in the opening 31 but in a full-on position there is such a wide opening through the valve that considerable latitude is permissible. Continued movement of the valve member clockwise will result in the projections 42 riding up and out of the opening 31, then they will snap into the relatively small opening 32. The projections 42 nicely fit into the opening 32 to provide an accurate position of the valve member. In this position, which is the medium position, the opening 11 is in partial registry with the inlet 3 as shown in Fig. 7. Now, it will be observed how this position may be adjusted by adjusting the washer 30 as above described, through the means of the screw 35. It will be noted that at this time the recess 13 is also in partial registry with the inlet 3 so that the flow of gas is not cut off as the valve member passes through the position shown in Fig. 6 to the simmer position shown in Fig. 5 and vice versa. Continued movement clockwise of the valve ultimately causes the projection 41 to abut the stop 28 and the valve is now in simmer position as shown in Fig. 5. In this position, the gas flows from the inlet 3 through the passage 12 through the slot 17 and into the passage 11 of the valve member. The simmer adjustment is made by turning the throttling member 15. This is accomplished by inserting a suitable tool, such as a screw driver, into the hollow stem 9 and engaging and turning the nut 21. The movement of the head 15 varies the position of the slot 17 which throttles the passage 12. If desired, the simmer may be entirely closed by turning the throttling member 13 until the slot 17 is completely out of registry with the passage 12.

In the off position and in the simmer position, the projections 42 ride upon the face of the washer 30 thus compressing somewhat the spring 44. When the projections 42 come into alignment with the opening 31 or the opening 32, there is a snapping action which audibly indicates the position of the valve and provides the further indication of an increased turning torque required to cause the projections 42 to ride out of the opening.

We claim:

1. In a valve for controlling the flow of gas, a body member having inlet and outlet passages, a valve member rotatably seated in the body member, a gas passage in the valve member having an inner wall and an open end in communication with the outlet passage, said inner wall being of internal conical shape, a hollow operating stem extending axially from one end of the valve member, a port in the valve member connecting into the gas passage and arranged to be brought into and out of registry with the inlet passage in the body member for full flow of gas, an opening in the valve member between the hollow of the stem and the apex of the internal conical wall of said gas passage, a second port in the valve member arranged to be brought into and out of registry with said inlet passage in the body member and communicating with the said gas passage through the said conical wall for a lesser flow of gas, a throttle member having a conical head seated on said internal conical wall with the base thereof facing into the gas passage and having a stem extending from the apex thereof and journalled in said opening and projecting into the hollow of the operating stem, an enlargement on the stem of the throttle member and positioned in the hollow of the operating stem, a spring between the enlargement and the end of the hollow of the operating stem for yieldably urging the said conical head against the said internal conical wall to provide a gas seal, the said conical head having a slot therein for communication with the second named port and which opens through the base thereof for communication with the said gas passage, and means whereby the throttle member may be rotatably adjusted to vary the extent of registry of said slot with the second named port in the valve member.

2. A valve for controlling the flow of gas to a burner comprising, a body and a turnable valve member seated in the body, the body and valve member having ports arranged to be brought into and out of registry, an operating stem on the valve member, a cap fixedly secured to the body through which the stem extends, limit stops on the cap, a pair of washer members positioned on the operating stem and under the cap, a spring between the washer members and the valve member for holding the washer members in engagement with each other and holding the valve member seated in the body, one washer member being turnable with the valve member and having a projection for engaging the limit stops, said washer members having interengaging raised portions and recesses which interengage with each other under the action of said spring to indicate a position, intermediate said limit stops, of the valve member relative to the body, the cap having an elongated aperture therein and a screw with a head and threaded to the other of said washer members and passing through the elongated aperture, whereby the screw head may be tightened and loosened against the cap to adjustably position said other washer within the limits of the elongated slot.

ROBERT E. IMHOFF.
WILLIAM J. WILDERN.

REFERENCES CITED

The following references are of record in the file of this patent:

UNITED STATES PATENTS

| Number | Name | Date |
|---|---|---|
| 1,080,858 | Staby | Dec. 9, 1913 |
| 1,921,779 | Roberts | Aug. 8, 1933 |
| 1,933,177 | Kindl | Oct. 31, 1933 |
| 2,001,320 | Williamson | May 14, 1935 |
| 2,020,414 | Mueller | Nov. 12, 1935 |
| 2,142,368 | Mueller | Jan. 3, 1939 |
| 2,194,714 | Mueller | Mar. 26, 1940 |
| 2,249,982 | Rutherford | July 22, 1941 |
| 2,257,886 | Mueller | Oct. 7, 1941 |
| 2,262,703 | Stuckenholt | Nov. 11, 1941 |